US012795754B2

(12) United States Patent
Luo et al.

(10) Patent No.: US 12,795,754 B2
(45) Date of Patent: Nov. 10, 2026

(54) CONNECTION ESTABLISHMENT METHOD AND DEVICE, LINK STATE NOTIFICATION METHOD AND DEVICE, INTERFACE ESTABLISHMENT METHOD AND DEVICE, INFORMATION TRANSMISSION METHOD AND DEVICE, INTEGRATED ACCESS BACKHAUL NODE, CENTRALIZED UNIT, SYSTEM AND STORAGE MEDIUM

(71) Applicant: ZTE CORPORATION, Shenzhen (CN)

(72) Inventors: Wei Luo, Shenzhen (CN); Lin Chen, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 468 days.

(21) Appl. No.: 17/635,570

(22) PCT Filed: Jul. 21, 2020

(86) PCT No.: PCT/CN2020/103176

§ 371 (c)(1),
(2) Date: Feb. 15, 2022

(87) PCT Pub. No.: WO2021/027501

PCT Pub. Date: Feb. 18, 2021

(65) Prior Publication Data

US 2022/0322464 A1 Oct. 6, 2022

(30) Foreign Application Priority Data

Aug. 15, 2019 (CN) ........................ 201910768209.5

(51) Int. Cl.
*H04W 76/11* (2018.01)
*H04W 36/00* (2009.01)

(52) U.S. Cl.
CPC ........ *H04W 76/11* (2018.02); *H04W 36/0019* (2023.05); *H04W 36/0064* (2023.05)

(58) Field of Classification Search
None
See application file for complete search history.

(56) References Cited

U.S. PATENT DOCUMENTS

2019/0053183 A1 2/2019 Park et al.
2019/0313244 A1* 10/2019 Wang ...................... H04W 8/24
(Continued)

FOREIGN PATENT DOCUMENTS

CN 109151871 A 1/2019
CN 109151924 A 1/2019
(Continued)

OTHER PUBLICATIONS

3rd Generation Partnership Project; Technical Specification Group Radio Access network; NR; Study on Integrated Access and Backhaul; (Release 16); 3GPP TR 38.874 V16.0.0 (Dec. 2018), Jan. 10, 2019, Entire Document.

(Continued)

*Primary Examiner* — Mohammad S Adhami
(74) *Attorney, Agent, or Firm* — BOND, SCHOENECK & KING, PLLC; George R. McGuire

(57) ABSTRACT

Provided are a connection establishment method and device, a link state notification method and device, an interface establishment method and device, an information transmission method and device, an integrated access backhaul node, a centralized unit, a system, and a storage medium. The connection establishment method includes: acquiring address information of a first CU; and establishing a connection with the first CU according to the address information of the first CU.

4 Claims, 7 Drawing Sheets

(56) References Cited

U.S. PATENT DOCUMENTS

| | | | | |
|---|---|---|---|---|
| 2020/0120725 | A1* | 4/2020 | Mildh | H04W 76/12 |
| 2021/0058771 | A1* | 2/2021 | Wu | H04L 9/0861 |
| 2021/0227435 | A1* | 7/2021 | Hsieh | H04W 36/087 |
| 2021/0378035 | A1* | 12/2021 | Zhu | H04W 36/0019 |
| 2022/0014976 | A1* | 1/2022 | Luo | H04W 36/0064 |
| 2022/0078680 | A1* | 3/2022 | Wu | H04W 36/305 |
| 2022/0201777 | A1* | 6/2022 | Teyeb | H04W 76/11 |

FOREIGN PATENT DOCUMENTS

| | | | |
|---|---|---|---|
| CN | 109688631 | A | 4/2019 |
| KR | 20180083262 | A | 7/2018 |
| TW | 201841544 | A | 11/2018 |
| WO | 2009046660 | A1 | 4/2009 |
| WO | 2018203739 | A1 | 11/2018 |
| WO | 2019056970 | A1 | 3/2019 |

OTHER PUBLICATIONS

Indian Office Action, App. No. 202227014132, dated Sep. 5, 2022, Entire document.

Supplementary European Search Report and Search Opinion, App. No. 20853348.9, dated Jul. 14, 2023, pp. 1-21.

Samsung, 3GPP TSG-RAN WG3 Meeting #104; R3-192608; Further discussion on IP address issues of IAB network, 3GPP Draft; R3-192608, vol. RAN WG2—No. Reno, NV, USA; May 13, 2019-May 17, 2019, May 2, 2019, pp. 1-6, France, XP051712813, Retrieved from the Internet: URL:http://www.3gpp.org/ftp/tsg%5Fran/WG3%5Flu/TSGR3%5F104/Docs/R3%2D192608%2Ezip.

Huawei, 3GPP TSG-RAN WG3 Meeting #104; R3-192807; IP address management for IAB nodes, 3GPP Draft; R3-192807, vol. RAN WG3—No. Reno, Nevada, USA; May 13, 2019-May 17, 2019, May 3, 2019, pp. 1-3, France, XP051712999, Retrieved from the Internet: URL:http://www.3gpp.org/ftp/tsg%5Fran/WG3%5Flu/TSGR3%5F104/Docs/R3%2D192807%2Ezip.

Zte et. al., 3GPP TSG-RAN WG2 Meeting #104; R3-1817418; Discussion on IAB node discovery and selection, 3GPP Draft; R2-1817418, vol. RAN WG2—No. Spokane, USA; Nov. 12, 2018-Nov. 16, 2018, Nov. 2, 2018, pp. 1-8, France, XP051481323, Retrieved from the Internet: U'RL:http://www.3gpp.org/ftp/tsg%5Fran/WG2%5FRL2/TSGR2%5F104/Docs/R2%2D1817418%2Ezip.

Zte et. al., 3GPP TSG-RAN WG3 Meeting #104; R3-192519; Discussion on network-controlled IAB migration handling, 3GPP Draft; R3-192519, vol. RAN WG3—No. Reno, USA; May 13, 2019-May 17, 2019, May 13, 2019, pp. 1-5, France, XP051731802, Retrieved from the Internet: URL:http://www.3gpp.org/ftp/Meetings%5F3GPP%5FSYNC/RAN3/Docs/R3%2D192519%2Ezip.

Zte et. al., 3GPP TSG-RAN WG3 Meeting #105; R3-193655; Discussion on inter-CU IAB migration handling, 3GPP Draft; R3-193655, vol. RAN WG3—No. Ljubljana, Slovenija; Aug. 26, 2019-Aug. 30, 2019, Aug. 17, 2019, pp. 1-4, France, XP051769859, Retrieved from the Internet: URL:http://www.3gpp.org/ftp/tsg_ran/WG3_Tu/TSGR3_105/Docs/R3-193655.zip.

Qualcomm Incorporated (Rapporteur) TR 38.874, Version 0.5.0 3GPP TSG-RAN WG2 Meeting #103bis Chengdu, China, Oct. 8-12, 2018 pp. 1-82.

Qualcomm Incorporated (Rapporteur) "TR 38.874 Version 0.7.0" 3GPP TSG-RAN WG2 Meeting #104 R2-1819125 Spokane, WA, USA, Nov. 12-16, 2018 pp. 1-112.

Qualcomm Incorporated (Rapporteur) "TR 38.874, Version 0.40" 3GPP TSG-RAN WG2 Meeting #103 R2-1812054 Gothenburg, Sweden, Aug. 20-24, 2018 pp. 1-56.

Qualcomm Incorporated Presentation of Specification/Report to TSG: TR 38.874, Version 1.0.0 3GPP TSG RAN Meeting #82 Sorrento, Italy, Dec. 10-13, 2018 RP-182329 pp. 1-112.

Qualcomm Incorporated (Rapporteur) "TR 38.874, Version 0.6.2" 3GPP TSG-RAN WG2 Meeting #104 R2-1818568 Spokane, WA, USA, Nov. 12-16, 2018 pp. 1-98.

3GPP TR 38.874 V16.0.0 (Dec. 2018)—Technical Report 3rd Generation Partnership Project; Technical Specification Group Radio Access Network; NR; Study on Integrated Access and Backhaul; (Release 16) pp. 1-111.

Qualcomm Incorporated (Rapporteur) "TR 38.874, Version 0.3.2" 3GPP TSG-RAN WG2 Meeting #AH-1807 R2-1809731 Montreal, Canada, Jul. 2-6, 2018 pp. 1-40.

Qualcomm Incorporated (Rapporteur) "TR 38.874, Version 0." 3GPP TSG-RAN WG2 Meeting #104 R2-1816872 Spokane, WA, USA, Nov. 12-16, 2018 pp. 1-97.

Qualcomm Incorporated (Rapporteur) 3GPP TSG-RAN WG2 Meeting #104 Spokane, WA, USA, Nov. 12-16, 2018 R2-1818534 pp. 1-97.

International Search Report and Written Opinion, PCT/CN2020/103176, mailing date of search report, Oct. 27, 2020. pp. 1-8.

Qualcomm Inc. "IAB topological redundancy for architecture 1a" 3GPP TSG-RAN WG3 Meeting #101, R3-184694, Gothenburg, Sweden, Aug. 20-24, 2018, entire document pp. 1-10.

Qualcomm Inc., Nokia, Samsung "IAB inter-CU Topology Adaptation for Arch 1a" 3GPP TSG-RAN WG3 Meeting #102 R3-186456 Spokane, WA, USA, Nov. 12-16, 2018 pp. 1-10.

Qualcomm, Samsung, AT&7, KDDI Draft TR 38.874 v0.0.1 3GPP TSG-RAN WG2 NR Ad hoc 1801 R2-1800418 Vancouver, Canada, Jan. 22-Jan. 26, 2018 pp. 1-8.

Qualcomm, Samsung, AT&T, KDDI (Rapporteurs) Draft TR 38.874 v0.0.2 3GPP TSG-RAN WG2 NR Ad hoc 1801 R2-1801671 Vancouver, Canada, Jan. 22-Jan. 26, 2018 pp. 1-12.

Qualcomm Incorporated TR 38.874, Version 1.0.0 3GPP TSG-RAN WG2 NR Ad-hoc 1801 R2-1801675 Vancouver, Canada, Jan. 22-Jan. 26, 2018 pp. 1-12.

Qualcomm Incorporated TR 38.874, Version 0.1.1 3GPP TSG-RAN WG2 Meeting #101bis R2-1804848 Sanya, China, Apr. 16-20, 2018 pp. 1-14.

Qualcomm Incorporated (Rapporteur) TR 38.874, Version 0.2.1 3GPP TSG-RAN WG2 Meeting #102 R2-1808003 Busan, South Korea, May 21-25, 2018 pp. 1-20.

Translated Indian Office Action, App. No. 202227014132, dated May 7, 2024, pp. 1-3.

Canadian Office Action, App. No. 3148150, dated Oct. 11, 2024, Entire document.

Translated Chinese Office Action, App. No. 201910768209.5, dated Sep. 30, 2024, Entire document.

Translated Chinese Search Report, App. No. 2019107682095, dated Aug. 19, 2019, Entire document.

Huawei , "Route selection method for architecture 1a", 3rd Generation Partnership Project (3GPP), TSG-RAN WG2, meeting #104, R2-1817775, pp. 1-5, Nov. 2, 2018 (Nov. 2, 2018), Entire document.

* cited by examiner

CONNECTION ESTABLISHMENT METHOD AND DEVICE, LINK STATE NOTIFICATION METHOD AND DEVICE, INTERFACE ESTABLISHMENT METHOD AND DEVICE, INFORMATION TRANSMISSION METHOD AND DEVICE, INTEGRATED ACCESS BACKHAUL NODE, CENTRALIZED UNIT, SYSTEM AND STORAGE MEDIUM

CROSS-REFERENCE TO RELATED APPLICATIONS

This is a National Stage Application filed under 35 U.S.C. 371 based on International Patent Application No. PCT/CN2020/103176, filed on Jul. 21, 2020, which claims priority to Chinese Patent Application No. 201910768209.5 filed on Aug. 15, 2019, the disclosures of both of which are incorporated herein by reference in their entireties.

TECHNICAL FIELD

The present application relates to the field of communications, for example, a connection establishment method and device, a link state notification method and device, an interface establishment method and device, an information transmission method and device, an integrated access backhaul node, a centralized unit, a system and a storage medium.

BACKGROUND

Integrated access and backhaul (IAB) is an important technology in the 5th generation mobile communication technology (5G). The goal of IAB is to make one or more IAB-nodes connect to a parent node through New Radio (NR) using mobile terminal (MT) function part located locally, and on this basis, form a multi-hop wireless self-backhaul network. Each IAB-node contains one distributed unit (DU) function part and one MT function part. The DU is used for serving a user equipment (UE) of the current node and the MT of the next hop node and establishing a radio link control (RLC) connection with the next hop node. The function of the MT is equivalent to a UE and is used for accessing a parent node of the previous hop through a UN interface of NR and establishing an RLC connection with the parent node of the previous hop. Therefore, different IAB-nodes can access the parent node of the previous hop by using the wireless access capability of the local MT, and the parent node can be connected to the previous hop node and finally connected to a donor next generation NodeB (donor gNB). The donor gNB includes a donor centralized unit (CU) and multiple donor DUs, and each donor DU is connected to the donor CU in a wired manner. The donor CU and each donor DU, as well as the donor CU and the DU of each IAB-node, are connected via an enhanced F1 interface. The phenomenon where the parent node of the IAB-node is replaced is called IAB migration. When an IAB-node hands over to a new donor CU, child IAB-nodes connected to the IAB-node cannot maintain service continuity.

SUMMARY

Embodiments of the present application provide a connection establishment method, and the method includes the following.

Address information of a first CU is acquired.

A connection with the first CU is established according to the address information of the first CU.

The embodiments of the present application further provide a link state notification method, and the method includes the following.

A first communication node sends link state information to a second communication node, where the second communication node is a child node of the first communication node.

The link state information includes at least one of: identity information of a CU connected to the first communication node, change information of the CU connected to the first communication node, an IP address of the CU connected to the first communication node, a link migration indication of the first communication node or a link reestablishment indication of the first communication node.

The embodiments of the present application further provide an interface establishment method, and the method includes the following.

An interface establishment request message is sent to a first CU.

An interface establishment failure message sent by the first CU is received, where a cause value in the interface establishment failure message is unknown or is that a DU identity has been already allocated; or an interface establishment response message sent by the first CU is received, where the interface establishment response message includes a reallocated DU identity.

The embodiments of the present application further provide an information transmission method, and the method includes the following.

A handover request message is sent to a first CU, where the handover request message carries information of an IAB-node.

A handover response message sent by the first CU is received, where the handover response message carries at least one of: address information of the first CU or an identity of an IAB DU.

The embodiments of the present application further provide another information transmission method, and the method includes the following.

Identity information or address information of a first CU is sent to an IAB-node.

The embodiments of the present application further provide another interface establishment method, and the method includes the following.

An interface establishment request message is received from an IAB-node.

In a case where a DU identity of the IAB-node conflicts with another DU identity having a connection relationship with the DU identity, an interface establishment failure message is sent to the IAB-node, where a cause value in the interface establishment failure message is unknown or is that a DU identity has been already allocated; or an interface establishment response message is sent to the IAB-node, where the interface establishment response message includes a reallocated DU identity.

The embodiments of the present application further provide a connection establishment device, and the device includes an acquisition module and a connection establishment module.

The acquisition module is configured to acquire address information of a first CU.

The connection establishment module is configured to establish a connection with the first CU according to the address information of the first CU.

The embodiments of the present application further provide a link state notification device, and the device is applied to a first communication node and includes a link state information sending module.

The link state information sending module is configured to send link state information to a second communication node, where the second communication node is a child node of the first communication node.

The link state information includes at least one of: identity information of a CU connected to the first communication node, change information of the CU connected to the first communication node, an IP address of the CU connected to the first communication node, a link migration indication of the first communication node or a link reestablishment indication of the first communication node.

The embodiments of the present application further provide an interface establishment device, and the device includes a request sending module and a response receiving module.

The request sending module is configured to send an interface establishment request message to a first CU.

The response receiving module is configured to receive an interface establishment failure message sent by the first CU, where a cause value in the interface establishment failure message is unknown or is that a DU identity has been already allocated; or receive an interface establishment response message sent by the first CU, where the interface establishment response message includes a reallocated DU identity.

The embodiments of the present application further provide an information transmission device, and the device includes a handover request sending module and a handover response receiving module.

The handover request sending module is configured to send a handover request message to a first CU, where the handover request message carries information of an IAB-node.

The handover response receiving module is configured to receive a handover response message sent by the first CU, where the handover response message carries at least one of: address information of the first CU or an identity of an IAB DU.

The embodiments of the present application further provide another information transmission device, and the device includes an identity or address sending module.

The identity or address sending module is configured to send identity information or address information of a first CU to an IAB-node.

The embodiments of the present application further provide another interface establishment device, and the device includes a connection establishment receiving module and a connection establishment feedback module.

The connection establishment receiving module is configured to receive an interface establishment request message from an IAB-node.

The connection establishment feedback module is configured to, in a case where a DU identity of the IAB-node conflicts with another DU identity having a connection relationship with the DU identity, send an interface establishment failure message to the IAB-node, where a cause value in the interface establishment failure message is unknown or is that a DU identity has been already allocated; or send an interface establishment response message to the IAB-node, where the interface establishment response message includes a reallocated DU identity.

The embodiments of the present application further provide an IAB-node, and the IAB-node includes a processor and a memory.

The memory is configured to store instructions.

The processor is configured to read the instructions to perform any one of the connection establishment methods, the link state notification method or the first interface establishment method.

The embodiments of the present application further provide a CU, and the CU provides a processor and a memory.

The memory is configured to store instructions.

The processor is configured to read the instructions to perform any one of the information transmission method or the second interface establishment method.

The embodiments of the present application further provide a communication system, and the communication system includes the IAB-node and the CU described above.

The embodiments of the present application further provide a storage medium, and the storage medium includes a computer program, where the the computer program, when executed by a processor, performs any one of the methods described in the embodiments of the present application.

In the connection establishment method provided by the embodiments of the present application, the address information of a first CU is acquired and a connection with the first CU is established according to the address information, so that the problem that when an IAB-node hands over to a new donor CU, child IAB-nodes connected to the IAB-node cannot maintain service continuity.

DETAILED DESCRIPTION

Embodiments of the present application are described below in conjunction with the drawings.

Figure 1:
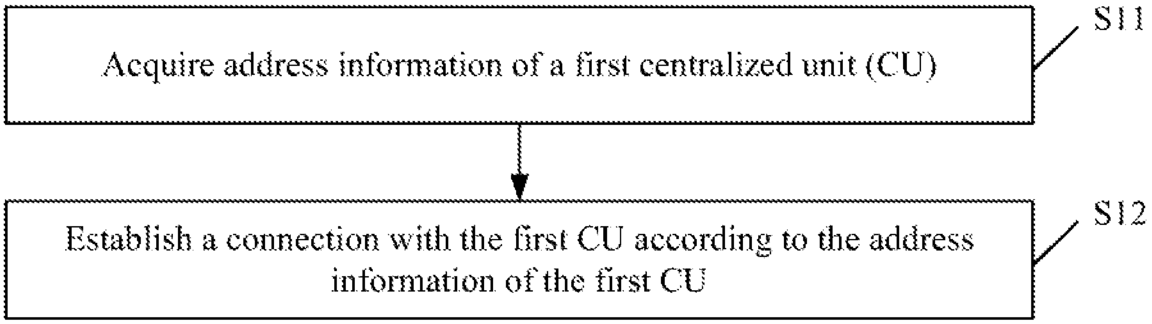
FIG. 1 is a flowchart one of a connection establishment method according to an embodiment of the present application.

An embodiment of the present application provides a connection establishment method. As shown in FIG. 1 that is a flowchart one of a connection establishment method according to an embodiment of the present application, the method includes S11 and S12.

In S11, address information of a first CU is acquired.

In S12, a connection is established with the first CU according to the address information of the first CU.

In an embodiment, the first CU may be a target donor CU, and after the connection is established with the first CU, an F1 setup request may be sent to the first CU. The execution object of the connection establishment method provided by this embodiment of the present application may be an IAB-node, especially a migrating IAB-node and a downstream IAB-node connected to the migrating IAB-node, or an IAB-node executing RRC reestablishment and a downstream IAB-node connected to the IAB-node executing RRC reestablishment. The downstream may refer to a direction away from an IAB-donor in multi-hop backhauling.

In an embodiment, S11 includes: identity information of the first CU is received, and a mapping relationship table between CU identity information and CU address information is looked up according to the identity information of the first CU to obtain the address information of the first CU.

The mapping relationship table between CU identity information and CU address information may be stored in advance, may be acquired through a network, or may be configured through operation administration and maintenance (OAM).

The identity information of the first CU may be carried in an adapter layer message that is from an upper layer IAB-node.

The upper layer IAB-node includes a parent IAB-node that directly provides services or an IAB-node that participates in forwarding data to the first CU.

The identity information of the first CU may also be carried in a radio resource control (RRC) reconfiguration message that is from the first CU.

The RRC reconfiguration message may include a cell identity and a physical cell identity, and the cell identity may include the identity information of the first CU.

In an embodiment, S11 includes: the address information of the first CU is received from a second CU.

The address information of the first CU may be carried in an F1 message or an RRC reconfiguration message.

In this embodiment of the present application, the second CU may be a source donor CU.

Figure 2:
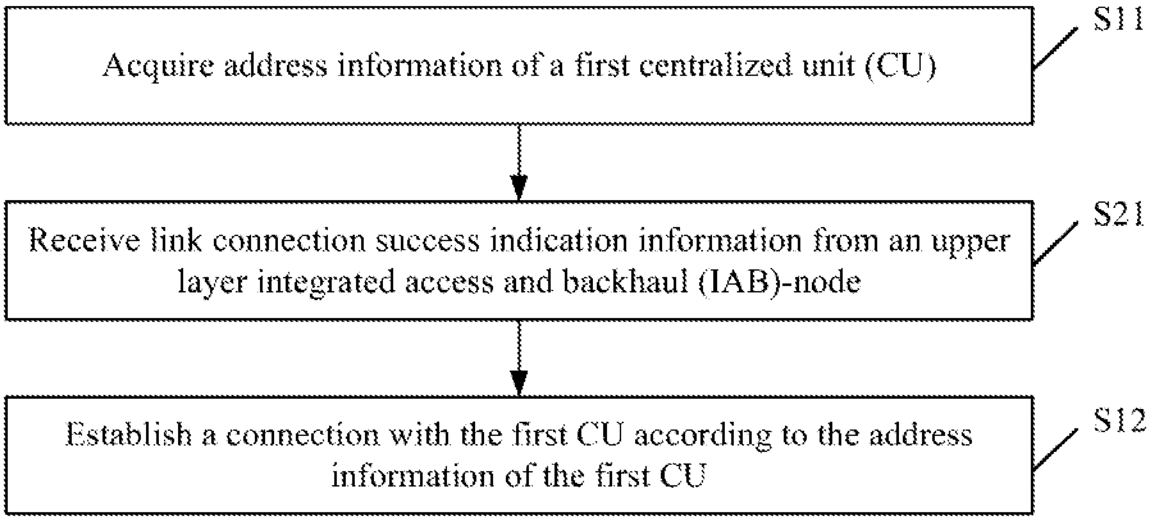
FIG. 2 is a flowchart two of a connection establishment method according to an embodiment of the present application.

FIG. 2 is a flowchart two of a connection establishment method according to an embodiment of the present application. As shown in FIG. 2, in an implementation, before the connection is established with the first CU in S12, the method further includes S21.

In S21, link connection success indication information is received from an upper layer IAB-node, where the link connection success indication information includes at least one of: the identity information of the first CU, a cell identity, a CU change identity, an Internet Protocol (IP) address of the first CU, a link migration success indication, a link reestablishment success indication, an identity of an IAB-node for link migration or an identity of an IAB-node for link reestablishment.

In an implementation, S11 includes: the address information of the first CU is received from the first CU.

The address information of the first CU may be carried in an RRC reconfiguration message.

An embodiment of the present application further provides a link state notification method. The method includes: a first communication node sends link state information to a second communication node, where the second communication node is a child node of the first communication node.

The link state information includes at least one of: identity information of a CU connected to the first communication node, change information of the CU connected to the first communication node, an IP address of the CU connected to the first communication node, a link migration indication of the first communication node or a link reestablishment indication of the first communication node.

In an embodiment, the first communication node and the second communication node are IAB-nodes.

The first communication node may send the link state information to the second communication node when performing link migration; or, the first communication node may send the link state information to the second communication node when performing RRC reestablishment.

In an embodiment, the link migration indication of the first communication node includes at least one of: a link migration initiation indication, a link migration success indication, or a link migration failure indication.

Figure 3:
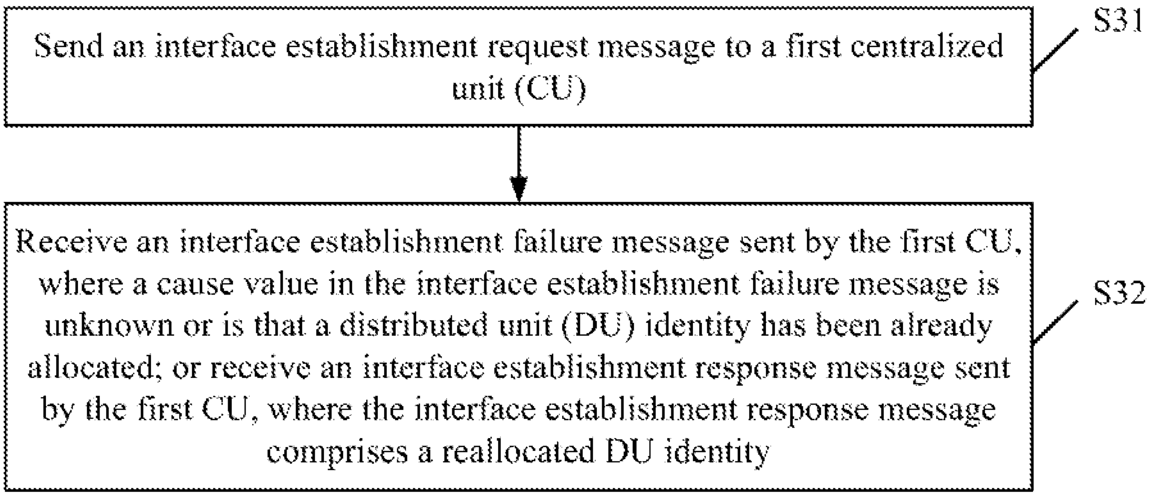
FIG. 3 is a flowchart one of an interface establishment method according to an embodiment of the present application.

An embodiment of the present application further provides an interface establishment method. As shown in FIG. 3 that is a flowchart one of an interface establishment method according to an embodiment of the present application, the method includes S31 and S32.

In S31, an interface establishment request message is sent to a first CU.

In S32, an interface establishment failure message sent by the first CU is received, where a cause value in the interface establishment failure message is unknown or is that a DU identity has been already allocated; or an interface establishment response message sent by the first CU is received, where the interface establishment response message includes a reallocated DU identity.

Figure 4:
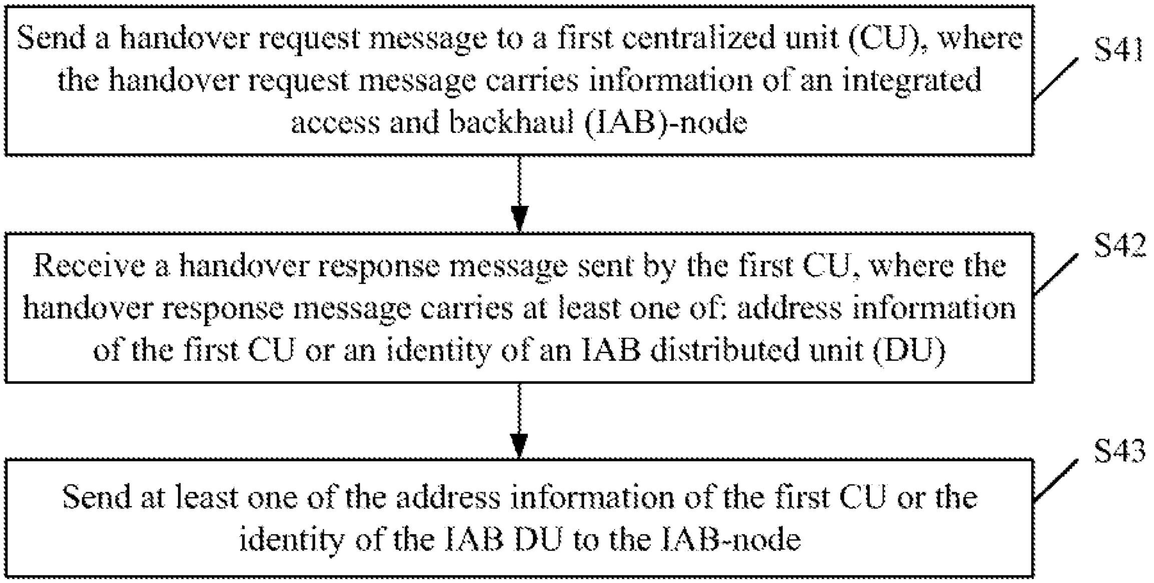
FIG. 4 is a flowchart of an information transmission method according to an embodiment of the present application.

An embodiment of the present application further provides an information transmission method. As shown in FIG. 4 that is a flowchart of an information transmission method according to an embodiment of the present application, the method includes S41 and S42.

In S41, a handover request message is sent to a first CU, where the handover request message carries information of an IAB-node.

In S42, a handover response message sent by the first CU is received, where the handover response message carries at least one of: address information of the first CU or an identity of an IAB DU.

The information transmission method provided by this embodiment may be applied to a source donor CU.

In a possible embodiment, the information of the IAB-node includes at least one of: identity information of the IAB-node, context information of a backhaul channel of the IAB-node, context information of a UE served by the IAB-node or context information of a downstream IAB-node of the IAB-node.

As shown in FIG. 4, the information transmission method provided by this embodiment of the present application may further include S43.

In S43, at least one of the address information of the first CU or the identity of the IAB DU is sent to the IAB-node.

In an embodiment, at least one of the address information of the first CU and the identity of the IAB DU is carried in an RRC reconfiguration message or an F1 message.

An embodiment of the present application further provides another information transmission method, and the method includes: identity information or address information of a first CU is sent to an IAB-node.

The information transmission method provided by this embodiment may be applied to a target donor CU.

The address information or the address information of the first CU may be carried in an RRC reconfiguration message.

In an embodiment, the RRC reconfiguration message includes a cell identity and a physical cell identity, and the cell identity carries the identity information of the first CU.

Figure 5:
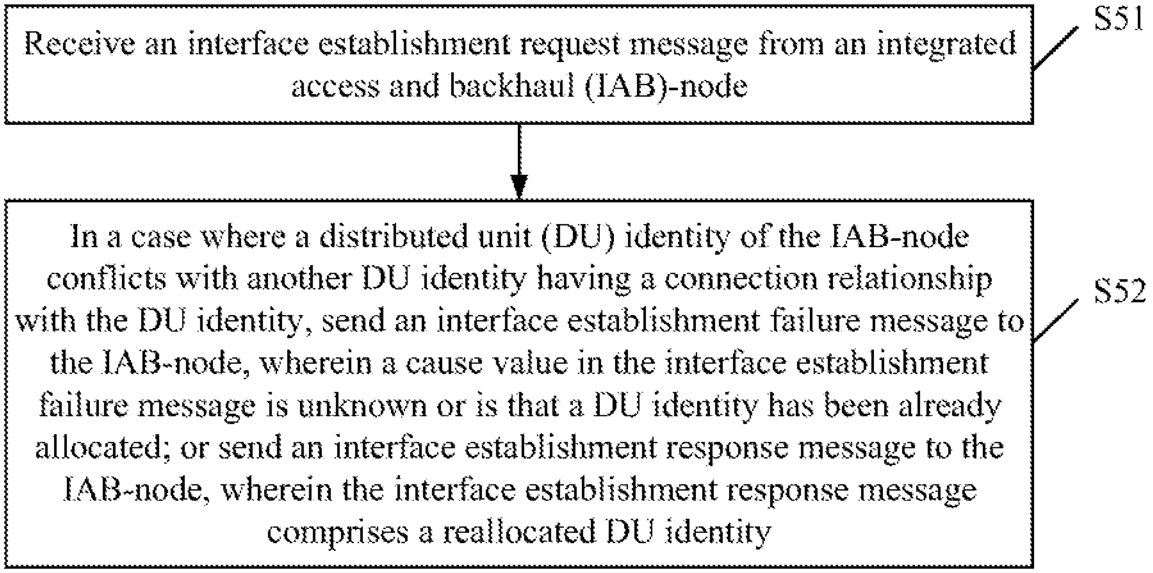
FIG. 5 is a flowchart two of an interface establishment method according to an embodiment of the present application.

An embodiment of the present application further provides an interface establishment method. As shown in FIG. 5 that is a flowchart two of an interface establishment method according to an embodiment of the present application, the method includes S51 and S52.

In S51, an interface establishment request message is received from an IAB-node.

In S52, in a case where a DU identity of the IAB-node conflicts with another DU identity having a connection relationship with the DU identity, an interface establishment failure message is sent to the IAB-node, where a cause value in the interface establishment failure message is unknown or is that a DU identity has been already allocated; or an interface establishment response message is sent to the IAB-node, where the interface establishment response message includes a reallocated DU identity.

Specific embodiments are described below with reference to drawings.

Embodiment One

In this embodiment, the IAB-node 3 is a child node of the IAB-node 1. When the IAB-node 1 handover happens, a source donor CU needs to send context information of the IAB-node 1 to a target donor CU.

Figure 6:
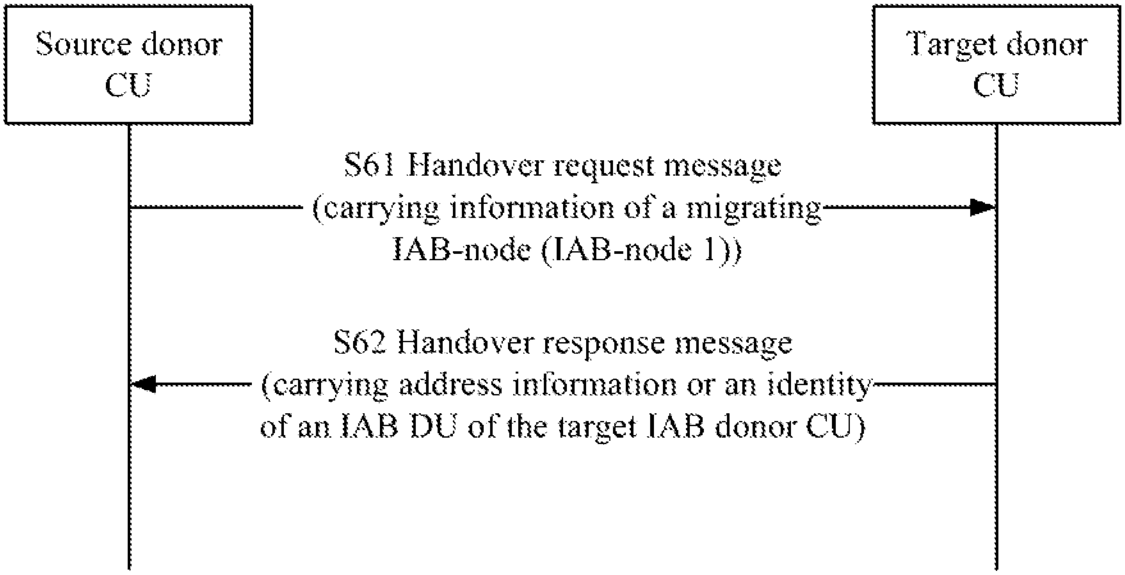
FIG. 6 that is an implementation flowchart of Embodiment one of the present application.

As shown in FIG. 6 that is an implementation flowchart of Embodiment one of the present application, Embodiment one includes S61 and S62.

In S61, a source donor CU sends a handover request message to a target donor CU, where the handover request message carries information of the migrating IAB-node 1.

In this embodiment, the information of the IAB-node 1 may include at least one of: identity information of the IAB-node 1, context information of a backhaul channel of the IAB-node 1, context information of a UE served by the IAB-node 1 or context information of a downstream IAB-node (for example, IAB-node 3) of the IAB-node 1.

In S62, the target donor CU sends a handover response message to the source donor CU, where the handover response message carries at least one of: address information of target donor CU or an identity of an IAB DU.

The identity of the IAB DU includes at least one of: a DU identity of a migrating node (for example, IAB-node 1) or a DU identity of a downstream node (for example, IAB-node 3) of the migrating node.

Embodiment Two

When the IAB-node 1 handover happens, this embodiment solves how the IAB-node 1 obtains the IP address of the target donor CU and how the downstream IAB node of a migrating IAB node obtains the IP address of the target donor CU if the migrating IAB node continues to serve the downstream IAB node.

In this embodiment, the IAB-node 3 is a child node of the IAB-node 1. For the downstream IAB node (that is, IAB-node 3), although the parent IAB-node of the downstream IAB node, that is, IAB-node 1, has not changed, the donor CU has changed. Therefore, the IAB-node 3 needs to be notified that the donor CU has changed. Moreover, in order to establish a new F1 connection, the IAB-node 3 needs to obtain the IP address of the target donor CU, which is because a gNB-DU needs to establish a transport network layer (TNL) connection of the gNB-DU before an F1 setup request message is sent to the gNB-DU and the IP address needs to be obtained to establish the TNL connection. This embodiment provides the following manners for the downlink IAB node to obtain the IP address of the target donor CU.

Manner 1

Each IAB-node (including a migrating IAB-node and a downlink IAB-node thereof) may configure a mapping table of CU identities (IDs) to CU IP addresses in advance, or download a mapping table of CU IDs to CU IP address from a network side, or configure a mapping table of CU IDs to CU IP addresses through OAM. In this way, the IAB-node only needs to obtain the gNB ID (that is, the CU ID of the target donor CU) of the target donor CU to look up the above-mentioned mapping table, so as to obtain the IP address of the target donor CU. The IP address may be a transport layer address. The IAB node may obtain the NR cell global identifier (NCGI) of the target donor CU and obtain the CU ID of the target donor CU according to the NCGI.

For the migrating IAB-node, the CU ID of the target donor CU may be obtained during the MT handover process.

If the migrating IAB-node continues to serve the downstream IAB-node, the downstream IAB-node may obtain the CU ID of the target donor CU in at least two manners. The first manner is as follows: the migrating IAB-node directly notifies the lower layer IAB-node through an adapter layer message after the handover is completed, and the lower layer IAB-node continues to notify a lower layer IAB-node of the lower layer IAB-node. The adapter layer message includes at least one of: identity information of the target, a cell identity, CU change identity, an IP address of the first CU or a link migration success indication.

The second manner is as follows: after the migrating IAB-node handover is completed, the target donor CU notifies the IAB-node 3 through RRC signaling (for example, RRC reconfiguration message) that the migration where the DU does not change but the CU changes happens. For example, the RRC reconfiguration message carries a cell identity and a physical cell identity, and the cell identity is used for indicating the CU ID (for example, the gNB ID of the target cell) of the target donor CU. Since the donor CU changes, the cell identity also changes; but since the DU has not changed, the physical cell identity may not change. The RRC reconfiguration message may contain additional information in addition to the above-mentioned identities.

Based on the above-mentioned information, the IAB MT or the UE may determine that the handover where the CU changes but the DU does not change happens, and the cell access process does not need to be re-performed but the update of the configuration information needs to be received subsequently. Then, the downstream IAB-node (for example, IAB-node 3 in this embodiment) may look up the above-mentioned mapping table, obtain the IP address of the target donor CU, establish a TNL connection with the target donor CU, and then initiate an F1 connection establishment procedure to the target donor CU.

Manner 2

Source donor CU sends the IP address of a target donor CU to a downstream IAB-node, which should be performed before the source donor CU sends a handover command to a migrating IAB-node.

Manner 2 may include the following two forms: Manner 2a and Manner 2b.

In Manner 2a, the source donor CU sends the IP address of the target donor CU to the DU part of the downstream IAB-node through an F1 interface.

In Manner 2b, the source donor CU sends the IP address of the target donor CU to the DU part of the downstream IAB-node through an RRC message.

In the case of Manner 2, the source donor CU needs to obtain the IP address of the target donor CU and may obtain the IP address of the target donor CU in one of the following manners: the source donor CU acquired the IP address of the target donor CU during the handover preparation process; the source donor CU configures a mapping table of CU IDs to CU IP addresses in advance; the source donor CU downloads a mapping table of CU IDs to CU IP addresses from a network side; or the source donor CU configures a mapping table of CU IDs to CU IP addresses through OAM.

For the migrating IAB-node, for Manner 2b, the source donor CU sends an RRC reconfiguration message to the MT of an IAB-node (for example, IAB-node 1 in this embodiment), and the RRC reconfiguration message may include the IP address of the target donor CU and other information such as a cell identity and a physical cell identity. For Manner 2a, the source donor CU sends an F1 message to the DU of an IAB-node (for example, IAB-node 1 in this embodiment), and the F1 message may include the IP address of the target donor CU and is used for instructing the DU of the downstream IAB-node to release the F1 connection with the source donor CU and establish the F1 connection with the target donor CU.

If the migrating IAB node continues to serve the downstream IAB-node, the source donor CU then determines which downstream IAB nodes need to hand over to the target donor CU. For Manner 2b, the source donor CU sends an RRC reconfiguration message to the MT of a downstream IAB-node (for example, IAB-node 3 in this embodiment), and the RRC reconfiguration message may include the IP address of the target donor CU and other information such as a cell identity and a physical cell identity. For Manner 2a, the source donor CU sends an F1 message to the DU of the downstream IAB-node (for example, IAB-node 3 in this embodiment), and the F1 message may include the IP address of the target donor CU and is used for instructing the DU of the downstream IAB-node to release the F1 connection with the source donor CU and establish the F1 connection with the target donor CU.

Since the above-mentioned information is sent before the migrating IAB-node handover and there is the possibility of handover failure for the migrating IAB-node, the downstream IAB-node, although receiving the above-mentioned information, cannot immediately initiate the new F1 connection establishment process. Therefore, when the downstream IAB-node (for example, IAB-node 3 in this embodiment) receives the above-mentioned information, the downstream IAB-node does not immediately initiate the F1 connection establishment process, but waits for the handover success of the parent IAB-node (for example, IAB-node 1 in this embodiment) before the downstream IAB-node releases the F1 connection with the source donor CU and establishes the F1 connection with the target donor CU. Then, after the migrating IAB-node handover is completed, the migrating IAB-node needs to send one piece of indication message to the IAB-node 3, and after the IAB-node 3 receives the indication information, the IAB-node 3 starts to perform the handover process of changing only the CU without changing the DU and establish a new F1 connection.

For the migrating IAB-node, directly carrying the IP address of the target donor CU in the RRC reconfiguration message is a simpler manner.

In an embodiment, the above-mentioned F1 connection may refer to an F1 access protocol (AP) connection.

Manner 3

A target donor CU sends the IP address of the target donor CU to the MT part of a downstream IAB-node through an RRC message.

For the migrating IAB-node, after the MT part of the IAB-node establishes an RRC connection with the target donor CU, the target donor CU sends the IP address to the MT part of the IAB-node through an RRC reconfiguration message, and then the MT part of the IAB-node notifies the DU part, so as to obtain the IP address of the target donor CU.

If the migrating IAB-node continues to serve the downstream IAB node, then for the downstream IAB node (for example, IAB-node 3 in this embodiment) of the migrating IAB node, after the DU part of the migrating IAB node is activated, the target donor CU may send an RRC reconfiguration message to a child IAB node (for example, IAB-node 3 in this embodiment) of the migrating IAB node, and the RRC reconfiguration message carries the IP address of the target donor CU. Upon receiving the RRC reconfiguration message, the child IAB-node may determine that the donor CU has changed and thus initiates the F1 connection establishment process with the target donor CU. The F1 connection herein may be an F1-C connection. After the F1 connection between the IAB-node 3 and the target donor CU is established, the target donor CU may continue to notify the IP address to the child IAB-node of the IAB-node 3 through the RRC messages.

Embodiment Three

If the UE needs to be handed over along with the migrating IAB node, although the serving DU is not updated, it is necessary to notify the UE of the cell ID and some configuration information due to the replacement of the CU. Then, after the DU function of the migrating IAB-node is activated, the donor CU may send an RRC reconfiguration message to notify the updated information, and the RRC reconfiguration message, for example, carries a target cell ID. In order to avoid that the UE is affected too much, after the DU replaces the CU, only the cell identity changes but the physical cell identity of the cell does not change. In this way, for the UE, when the UE accesses the same DU, a random access process does not need to be performed to find a new cell, and the resources of the physical layer and the media access control (MAC) layer do not change. Because the CU changes, packet data convergence protocol (PDCP)-related configuration information and service data adaptation protocol (SDAP)-related configuration information also change. Then, the donor CU may notify the UE of the updated cell configuration information (new cell identity and unchanged PCI) and bearer configuration information through the RRC reconfiguration message, where the bearer configuration information may include the above-mentioned PDCP-related configuration information and SDAP-related configuration information. In addition, the updated cell configuration information may also include public land mobile network (PLMN) information, a tracking area code (TAC), and upstream and downstream slot configuration information.

Embodiment Four

According to the related art, the gNB-DU ID is unique within one gNB-CU, but if the CU is replaced, there is a possibility of conflict. Therefore, when the DU replaces the CU, when the CU receives the connection establishment request with the CU initiated by the DU, if it is found that the current gNB-DU ID conflicts with the gNB-DU IDs of other connections, the F1 setup failure message may be sent, and the cause value therein is set to unknown or an already allocated DU identity (already allocated gNB-DU ID); or an F1 setup response message may be sent, and the F1 setup response message carries a new DU ID allocated by the CU to the gNB-DU.

In addition, the gNB-CU UE F1AP ID, the gNB-CU-CP UE E1AP ID, and the gNB-CU-UP UE E1AP ID are also processed in the same manner described above.

Embodiment Five

According to the related art, the gNB-DU ID is unique within one gNB-CU, but if the CU is replaced, in a case where the already allocated DU identity continues to be used, there is a possibility of conflict. Therefore, when the DU replaces the CU, in order to avoid the possibility of conflict, the target CU may allocate a new DU identity to the DU in advance. At least the following two solutions may be adopted in this embodiment of the present application.

Manner 1

A source CU sends a handover request message to a target CU, where the handover request message carries information of an IAB-node.

The source CU receives a handover response message sent by the target CU, where the handover response message carries identity information of an IAB DU.

The source CU herein sends the identity information of the IAB DU to the IAB-node, and the IAB-node may then use the identity information to establish an F1 connection with the target CU.

If the migrating IAB-node continues to serve the downstream IAB-node, for the downstream IAB-node (for example, IAB-node 3 in this embodiment) of the migrating IAB-node, the source CU may also send the identity information of the downstream IAB DU to the downstream IAB node in a similar manner, and then the downstream IAB-node may use the identity information to establish an F1 connection with the target CU.

Manner 2

For the migrating IAB-node, after the MT part of the IAB-node establishes an RRC connection with the target donor CU, the target donor CU sends the identity information of the IAB DU to the MT part of the IAB-node through an RRC reconfiguration message, then the MT part of the IAB-node notifies the DU part, and the IAB-node may use the identity information to establish an F1 connection with the target CU.

If the migrating IAB-node continues to serve the downstream IAB-node, the downstream IAB-node (for example, IAB-node 3 in this embodiment) of the migrating IAB-node may also use the above-mentioned manner. After the MT part of the downstream IAB-node establishes an RRC connection with the target donor CU, the target donor CU sends the identity information of the IAB DU to the MT part of the downstream IAB-node through an RRC reconfiguration message, then the MT part of the downstream IAB-node notifies the DU part, and the downstream IAB-node may use the identity information to establish an F1 connection with the target CU.

Embodiment Six

When the IAB-node needs to perform RRC reestablishment due to link failure or other causes, if the reestablished cell is connected to a new target donor CU, the IP address of the target CU needs to be re-obtained. For example, the target donor CU sends its own IP address information to the MT part of the IAB-node through an RRC reconfiguration message, then the MT part of the IAB-node notifies the DU part, and the DU part of the IAB-node may use the IP address to establish a TNL connection with the target CU and then establish an F1 connection.

In addition, if the IAB-node continues to serve the downstream IAB-node after reestablishing a new target donor CU, the downstream IAB-node also needs to re-establish an F1 connection with the new target donor CU and obtain the IP address of the target donor CU. One manner is as follows: the target donor CU sends its own IP address information to the MT part of the downstream IAB-node through an RRC reconfiguration message, then the MT part of the downstream IAB-node notifies the DU part, and the DU part of the downstream IAB-node may use the IP address to establish a TNL connection with the target CU and then establish an F1 connection. Another manner is as follows: after the IAB-node performs RRC reestablishment, the IAB-node sends the indication information of reestablishment completion to the downstream IAB node through an adapter layer message, and the adapter layer message includes at least one of: identity information of the target, a cell identity, CU change identity, an IP address of the first CU or a link migration success indication.

The above implementation is similar to some manners in the above-mentioned embodiments, and details are not repeated here.

Embodiment Seven

When the IAB-node needs to perform RRC reestablishment due to link failure or other causes, if the reestablished cell is connected to a new target donor CU, in a case where the already allocated DU identity continues to be used, there is a possibility of conflict. Therefore, when the DU replaces the CU, in order to avoid the possibility of conflict, the target CU may allocate a new DU identity to the DU in advance.

For example, the target donor CU sends identity information of an IAB DU to the MT part of the IAB-node through an RRC reconfiguration message, then the MT part of the IAB-node notifies the DU part, and the DU part of the IAB-node may use the identity information to establish an F1 connection with the target CU. The above implementation is similar to some manners in the above-mentioned embodiments, and details are not repeated here.

Embodiment Eight

In this embodiment, a first communication node (for example, a parent IAB-node) may send link state information to a second communication node (for example, a child IAB-node of the first communication node) when performing link migration or RRC reestablishment. The link state information may include at least one of: identity information of a CU connected to the first communication node, change information of the CU connected to the first communication node, an IP address of the CU connected to the first communication node, a link migration indication of the first communication node or a link reestablishment indication of the first communication node. The link migration indication of the first communication node may include at least one of: a link migration initiation indication, a link migration success indication, or a link migration failure indication.

Figure 7:
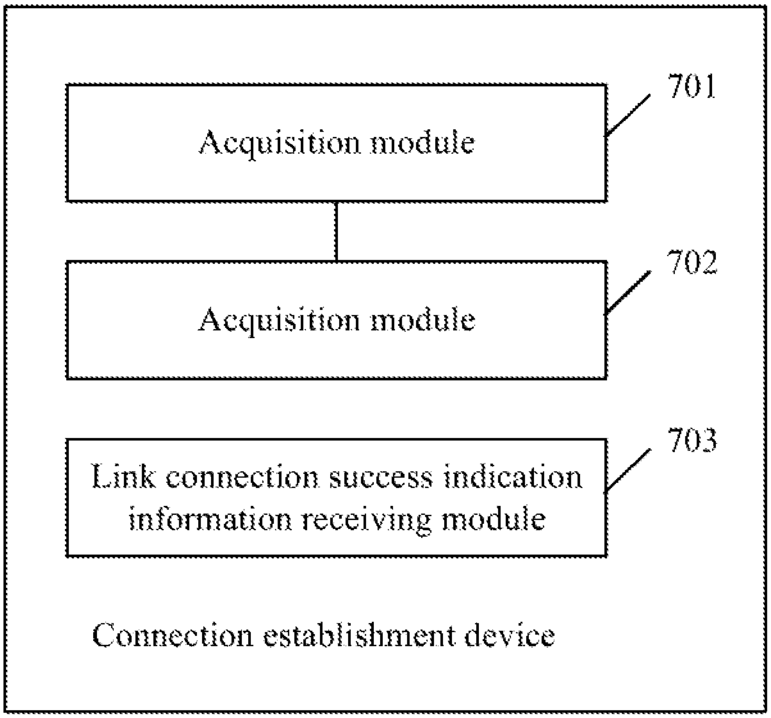
FIG. 7 is a structural schematic diagram of a connection establishment device according to an embodiment of the present application.

An embodiment of the present application further provides a connection establishment device. As shown in FIG. 7 that is a structural schematic diagram of a connection establishment device according to an embodiment of the present application, the device includes an acquisition module 701 and a connection establishment module 702.

The acquisition module 701 is configured to acquire address information of a first CU.

The connection establishment module 702 is configured to establish a connection with the first CU according to the address information of the first CU.

In an embodiment, the acquisition module 701 is configured to receive identity information of the first CU, and look up, according to the identity information of the first CU, a mapping relationship between CU identity information and CU address information to obtain the address information of the first CU.

The mapping relationship table between CU identity information and CU address information may be stored in advance, may be acquired through a network, or may be configured through OAM.

In an embodiment, the acquisition module 701 is configured to receive the address information of the first CU from a second CU or the first CU.

As shown in FIG. 7, the device may further include a link connection success indication information receiving module 703.

The link connection success indication information receiving module 703 is configured to receive link connection success indication information from an upper layer IAB-node; where the link connection success indication information includes at least one of: the identity information of the first CU, a cell identity, a CU change identity, an IP address of the first CU, a link migration success indication, a link reestablishment success indication, an identity of an IAB-node for link migration or an identity of an IAB-node for link reestablishment.

An embodiment of the present application further provides a link state notification device, and the device may be applied to a first communication node and includes a link state notification information sending module.

The link state notification information sending module is configured to send link state information to a second communication node, where the second communication node is a child node of the first communication node.

The link state information includes at least one of: identity information of a CU connected to the first communication node, change information of the CU connected to the first communication node, an IP address of the CU connected to the first communication node, a link migration indication of the first communication node or a link reestablishment indication of the first communication node.

The first communication node and the second communication node may be IAB-nodes.

Figure 8:
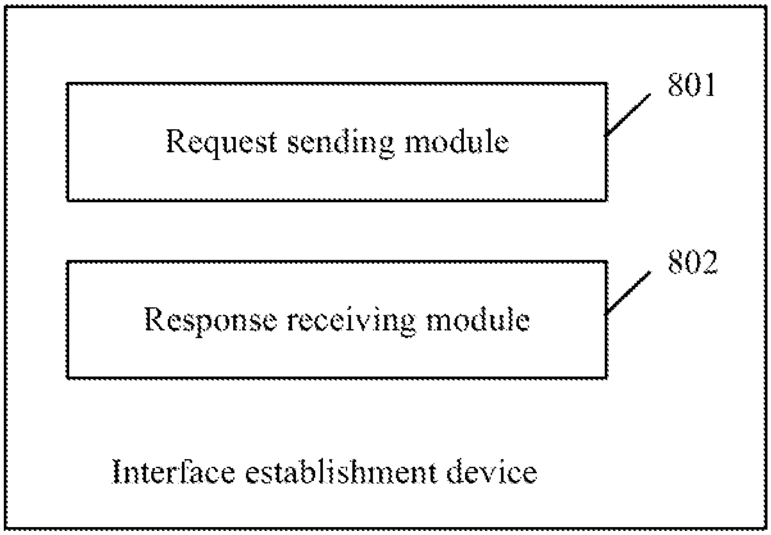
FIG. 8 is a structural schematic diagram one of an interface establishment device according to an embodiment of the present application.

An embodiment of the present application further provides an interface establishment device. As shown in FIG. 8 that is a structural schematic diagram one of an interface establishment device according to an embodiment of the present application, the device includes a request sending module 801 and a response receiving module 802.

The request sending module 801 is configured to send an interface establishment request message to a first CU.

The response receiving module 802 is configured to receive an interface establishment failure message sent by the first CU, where a cause value in the interface establishment failure message is unknown or is that a DU identity has been already allocated; or receive an interface establishment response message sent by the first CU, where the interface establishment response message includes a reallocated DU identity.

Figure 9:
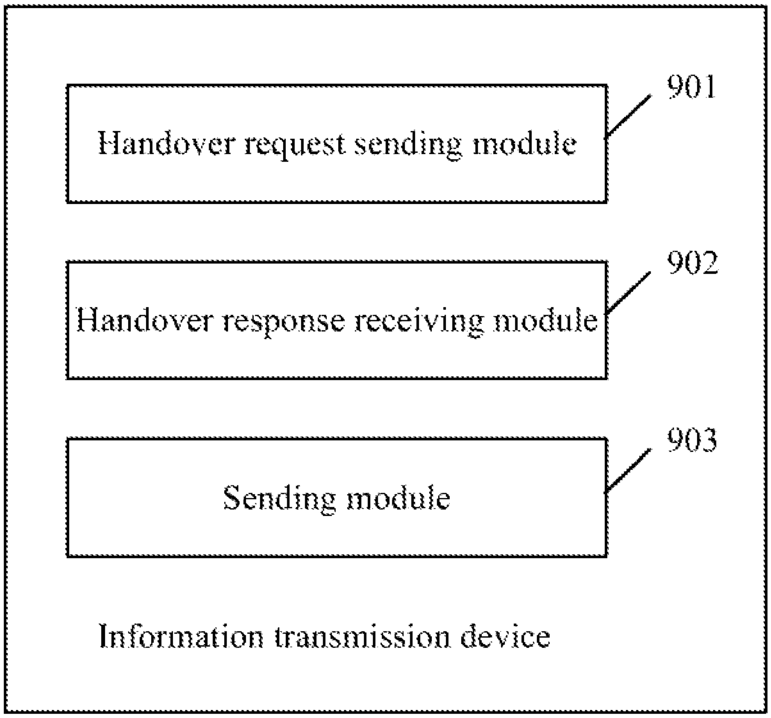
FIG. 9 is a structural schematic diagram of an information transmission device according to an embodiment of the present application.

An embodiment of the present application further provides an information transmission device. As shown in FIG. 9 that is a structural schematic diagram of an information transmission device according to an embodiment of the present application, the device includes a handover request sending module 901 and a handover response receiving module 902.

The handover request sending module 901 is configured to send a handover request message to a first CU, where the handover request message carries information of an IAB-node.

The handover response receiving module 902 is configured to receive a handover response message sent by the first CU, where the handover response message carries at least one of: address information of the first CU or an identity of an IAB DU.

As shown in FIG. 9, the device may further include a sending module 903.

The sending module 903 is configured to send at least one of the address information of the first CU or the identity of the IAB DU to the IAB-node.

An embodiment of the present application further provides another information transmission device. The device includes an identity or address sending module, which is configured to send identity information or address information of a first CU to an IAB-node.

Figure 10:
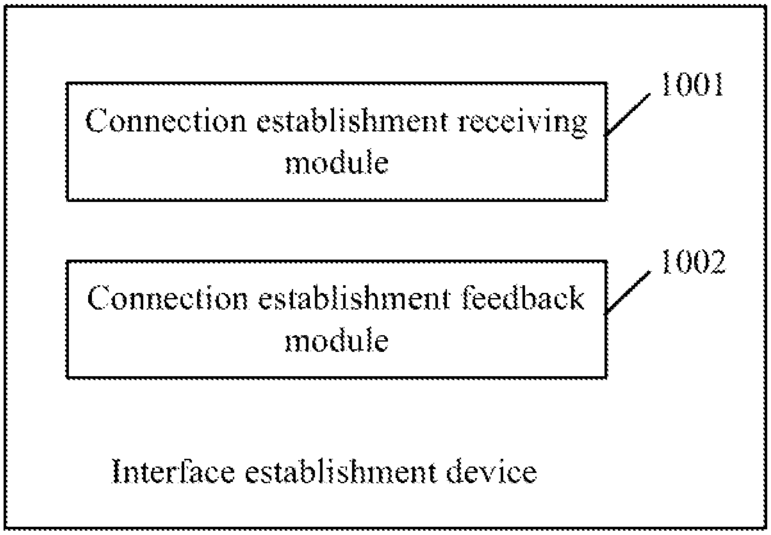
FIG. 10 is a structural schematic diagram two of an interface establishment device according to an embodiment of the present application.

An embodiment of the present application further provides another interface embellishment device. As shown in FIG. 10 that is a structural schematic diagram two of an interface establishment device according to an embodiment of the present application, the device includes a connection establishment receiving module 1001 and a connection establishment feedback module 1002.

The connection establishment receiving module 1001 is configured to receive an interface establishment request message from an IAB-node.

The connection establishment feedback module 1002 is configured to, in a case where a DU identity of the IAB-node conflicts with another DU identity having a connection relationship with the DU identity, send an interface establishment failure message to the IAB-node, where a cause value in the interface establishment failure message is unknown or is that a DU identity has been already allocated; or send an interface establishment response message to the IAB-node, where the interface establishment response message includes a reallocated DU identity.

Figure 11:
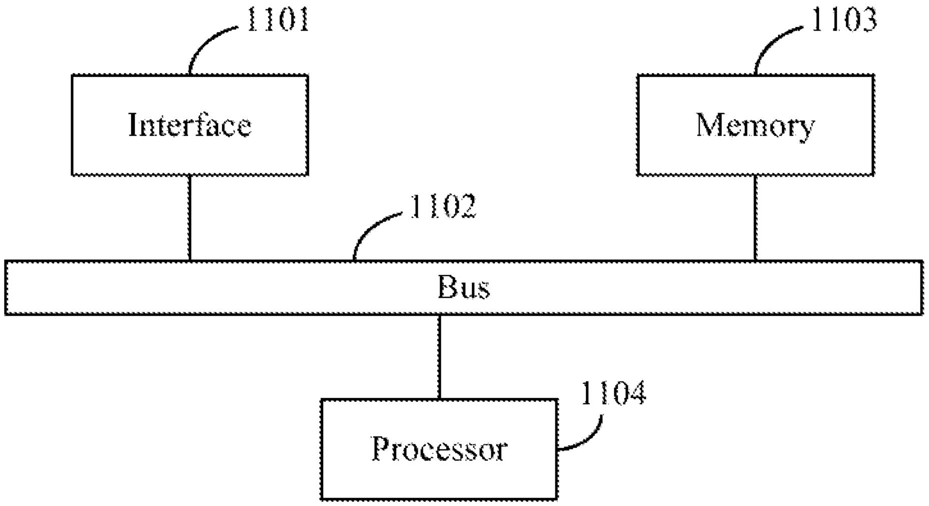
FIG. 11 is a structural schematic diagram of an IAB-node for connection establishment or interface establishment according to an embodiment of the present application.

FIG. 11 is a structural schematic diagram of an IAB node according to an embodiment of the present application. As shown in FIG. 11, the IAB node 110 provided by this embodiment of the present application includes a memory 1103 and a processor 1104. The IAB node 110 may further include an interface 1101 and a bus 1102. The interface 1101, the memory 1103, and the processor 1104 are connected via the bus 1102. The memory 1103 is configured to store instructions. The processor 1104 is configured to read the instructions to execute the technical solutions of the above-described method embodiments applied to the IAB node. The implementation principles and technical effects of the processor are similar to those of the method embodiments, and details are not repeated here.

Figure 12:
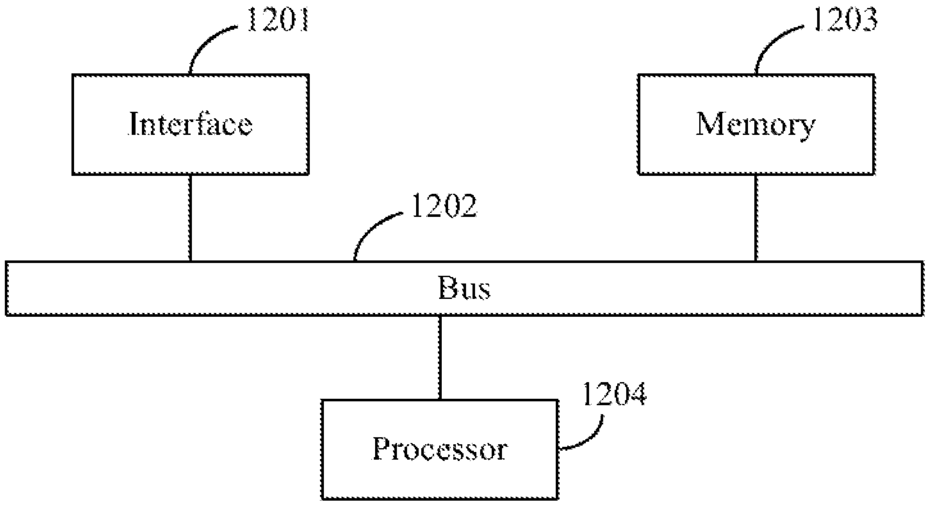
FIG. 12 is a structural schematic diagram of a CU for information transmission or interface establishment according to an embodiment of the present application.

FIG. 12 is a structural schematic diagram of a CU according to an embodiment of the present application. As shown in FIG. 12, the CU 120 provided by this embodiment of the present application includes a memory 1203 and a processor 1204. The CU 120 may further include an interface 1201 and a bus 1202. The interface 1201, the memory 1203, and the processor 1204 are connected via the bus 1202. The memory 1203 is configured to store instructions. The processor 1204 is configured to read the instructions to execute the technical solutions of the above method embodiments applied to the CU. The implementation principles and technical effects of the processor are similar to those of the method embodiments, and details are not repeated here.

Figure 13:
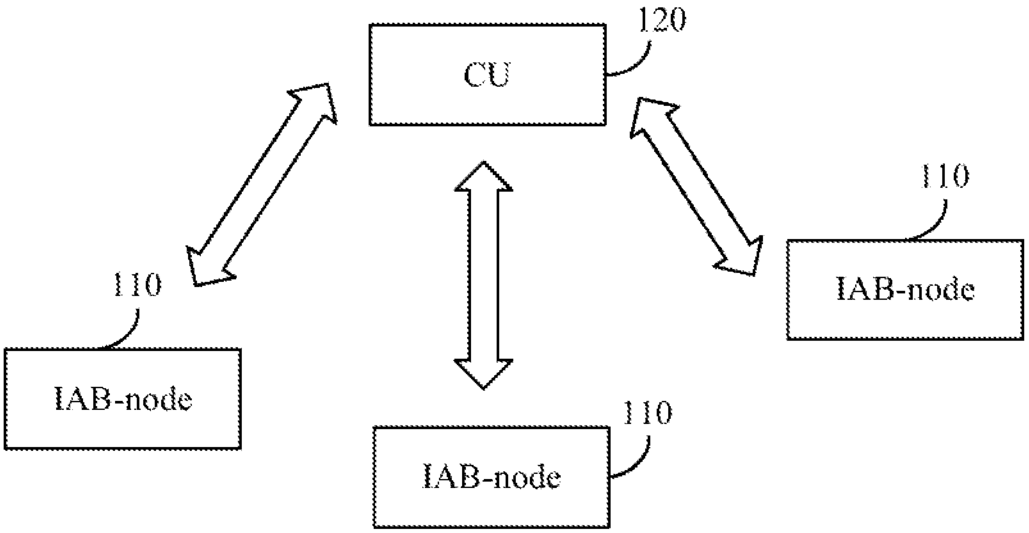
FIG. 13 is a structural schematic diagram one of a communication system according to an embodiment of the present application.

FIG. 13 is a structural schematic diagram one of a communication system according to an embodiment of the present application. As shown in FIG. 13, the system includes the IAB node 110 described in the above-described embodiment and the CU 120 described in the above-described embodiment.

Figure 14:
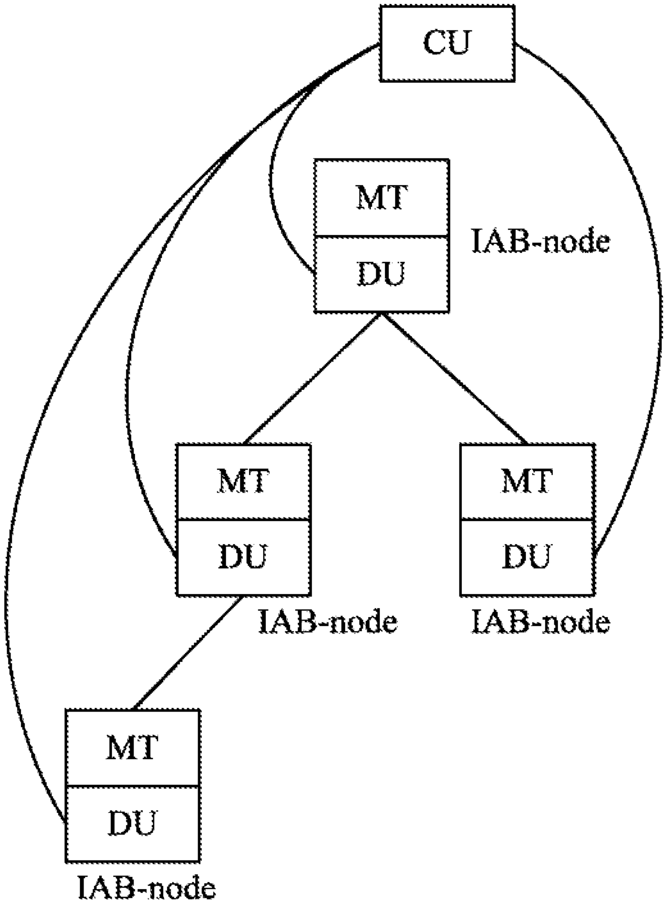
FIG. 14 is a structural schematic diagram two of a communication system according to an embodiment of the present application.

FIG. 14 is a structural schematic diagram two of a communication system according to an embodiment of the present application. As shown in FIG. 14, the system includes the IAB-node 110 described in the above-mentioned embodiment and the CU 120 described in the above-mentioned embodiment. Each IAB-node is divided into an MT part and a DU part. The MT part of each IAB-node has a Uu connection with a DU respectively, and the DU part of each IAB-node has an F1 connection with the CU respectively.

The present application provides a storage medium. The storage medium is configured to store a computer program which, when executed by a processor, performs the method of the above-described embodiments.

The embodiments of the present application may be provided as methods, systems or computer program products. Therefore, the present application may take the form of a hardware embodiment, a software embodiment, or an embodiment combining software and hardware. The present application may take the form of a computer program product implemented on one or more computer-usable storage media (including, but not limited to, a disk memory and an optical memory) that include computer-usable program codes.

The present application is described with reference to flowcharts and/or block diagrams of methods, apparatus (systems) and computer program products according to embodiments of the present application. It should be understood that computer program instructions implement each flow and/or block in the flowcharts and/or block diagrams and a combination of flows and/or blocks in the flowcharts and/or block diagrams. These computer program instructions may be provided to a processor of a general-purpose computer, special-purpose computer, embedded processor or another programmable data processing device to produce a machine so as to enable the instructions executed by the processor of the computer or another programmable data processing device to generate an apparatus for implementing the functions specified in one or more flows in the flowcharts and/or one or more blocks in the block diagrams.

These computer program instructions may also be stored in a computer-readable memory that can direct a computer or another programmable data processing device to operate in a particular manner, so that the instructions stored in the computer-readable memory produce an article of manufacture including an instruction apparatus. The instruction apparatus implements the functions specified in one or more flows in the flowcharts and/or one or more blocks in the block diagrams.

These computer program instructions may also be loaded onto a computer or another programmable data processing device so that a series of operating steps are performed on a computer or another programmable device, and thereby the instructions executed on the computer or another programmable device provide steps for implementing the functions specified in one or more flows in the flowcharts and/or one or more blocks in the block diagrams.

The preceding are merely embodiments of the present application and are not intended to limit the scope of the present application.

What is claimed is:

1. A connection establishment method, applied to an integrated access and backhaul (IAB)-node, comprising:

receiving, by a distributed unit (DU) of the IAB node, from a source donor centralized unit (CU), Internet Protocol (IP) address information of a target donor CU via an F1 application protocol (AP) message;

receiving link connection success indication information from an upper layer IAB-node, wherein the link connection success indication information comprises at least one of: identity information of the target donor CU, a cell identity, a CU change identity, an Internet Protocol (IP) address of the target donor CU, a link migration success indication, a link reestablishment success indication, an identity of an IAB-node for link migration or an identity of an IAB-node for link reestablishment;

after receiving the link connection success indication information, establishing a transport network layer (TNL) connection to the target donor CU based on the received IP address information; and after establishing the TNL connection, transmitting an F1 Setup Request message to the target donor CU to establish an F1 AP connection with the target donor CU.

2. An information transmission method, applied to a source donor centralized unit (CU), comprising:

sending, to a distributed unit (DU) of an integrated access and backhaul (IAB) node, Internet Protocol (IP) address information of a target donor CU via an F1 application protocol (AP) message;

wherein the IP address information is used by the IAB node to, after receiving link connection success indication information from an upper layer IAB-node, establish a transport network layer (TNL) connection to the target donor CU and subsequently transmit an F1 Setup Request message to the target donor CU to establish an F1 AP connection with the target donor CU, wherein the link connection success indication information comprises at least one of: identity information of the target donor CU, a cell identity, a CU change identity, an Internet Protocol (IP) address of the target donor CU, a link migration success indication, a link reestablishment success indication, an identity of an IAB-node for link migration or an identity of an IAB-node for link reestablishment.

3. An integrated access and backhaul (IAB)-node, comprising a processor and a memory;

wherein the memory is configured to store instructions; and the processor is configured to read the instructions to perform the method of claim 1.

4. A centralized unit (CU), comprising a processor and a memory;

wherein the memory is configured to store instructions; and the processor is configured to read the instructions to perform the method of claim 2.

* * * * *